(12) United States Patent
Andrews et al.

(10) Patent No.: US 10,209,054 B2
(45) Date of Patent: Feb. 19, 2019

(54) NON-INVASIVE THICKNESS MEASUREMENT USING CAPACITANCE MEASUREMENT

(71) Applicant: Duke University, Durham, NC (US)

(72) Inventors: Joseph Batton Andrews, Durham, NC (US); Martin Brooke, Hillsborough, NC (US); Aaron D. Franklin, Cary, NC (US)

(73) Assignee: DUKE UNIVERSITY, Durham, NC (US)

( * ) Notice: Subject to any disclaimer, the term of this patent is extended or adjusted under 35 U.S.C. 154(b) by 0 days.

(21) Appl. No.: 15/133,727

(22) Filed: Apr. 20, 2016

(65) Prior Publication Data

US 2017/0307349 A1    Oct. 26, 2017

(51) Int. Cl.
| G01R 27/04 | (2006.01) |
| G01R 27/08 | (2006.01) |
| G01R 27/26 | (2006.01) |
| G01B 7/06 | (2006.01) |
| G01M 17/02 | (2006.01) |

(Continued)

(52) U.S. Cl.
CPC .............. *G01B 7/08* (2013.01); *G01M 17/02* (2013.01)

(58) Field of Classification Search
CPC ........ G01R 27/04; G01R 27/08; G01R 27/26; G01B 7/06; G01B 7/08; G01B 15/02; G01M 17/02; G01N 27/02; G01N 27/22; G01N 21/00

See application file for complete search history.

(56) References Cited

U.S. PATENT DOCUMENTS

| 3,243,701 A | 3/1966 | Strand |
| 3,801,900 A | 4/1974 | Szasz |

(Continued)

FOREIGN PATENT DOCUMENTS

| CN | 101001763 A | 7/2007 |
| CN | 101790672 B | 7/2010 |

(Continued)

OTHER PUBLICATIONS

TW Search Report dated Feb. 13, 2017 in re TW Patent Application No. 105117250 filed Jun. 1, 2016.

(Continued)

*Primary Examiner* — Neel Shah
(74) *Attorney, Agent, or Firm* — Coats & Bennett, PLLC

(57) ABSTRACT

Methods of measuring thickness of a material using cross-capacitance. The method generally includes applying a time-varying signal to a first pad and monitoring a response of a capacitor formed by the first pad, a spaced apart second pad, and the material. The pads may be permanently affixed to the material, in spaced relation to each other. Based on the response, a capacitance of the capacitor is determined. The material may be homogenous or heterogeneous, and has dielectric properties. Because the material acts as a dielectric, the capacitance of the capacitor changes as the thickness of the material changes. Thus, the thickness of the material may be determined based on the determined capacitance. The method may be advantageously employed to measure the thickness of a vehicle tire or other material. Related apparatuses are also disclosed.

12 Claims, 7 Drawing Sheets

(51) Int. Cl.
*G01B 15/02* (2006.01)
*G06F 15/00* (2006.01)
*G01N 27/02* (2006.01)
*G01N 27/22* (2006.01)
*G01N 21/00* (2006.01)

(56) References Cited

U.S. PATENT DOCUMENTS

| | | | |
|---|---|---|---|
| 5,075,979 A | 12/1991 | Foskett | |
| 5,081,421 A | 1/1992 | Miller et al. | |
| 5,093,626 A | 3/1992 | Baer et al. | |
| 5,198,777 A | 3/1993 | Masuda et al. | |
| 5,398,547 A * | 3/1995 | Gerardi | B64D 15/20 244/134 F |
| 5,485,091 A | 1/1996 | Verkuil | |
| 5,485,097 A | 1/1996 | Wang | |
| 5,491,421 A | 2/1996 | Katsuie | |
| 5,528,153 A | 6/1996 | Taylor et al. | |
| 6,198,294 B1 * | 3/2001 | Black | G01B 7/08 324/663 |
| 6,239,601 B1 * | 5/2001 | Weinstein | B64D 15/20 324/649 |
| 6,388,452 B1 * | 5/2002 | Picciotto | B41J 11/0035 324/663 |
| 6,538,459 B1 | 3/2003 | Sticha | |
| 6,794,886 B1 | 9/2004 | Chen et al. | |
| 7,546,764 B2 | 6/2009 | Morinaga et al. | |
| 8,020,597 B2 * | 9/2011 | Ellwood | B60C 5/142 152/510 |
| 8,794,058 B2 | 8/2014 | Bigot et al. | |
| 2002/0104605 A1 * | 8/2002 | Ikehara | B29D 30/0601 156/130.7 |
| 2005/0156606 A1 | 7/2005 | Sergoyan et al. | |
| 2006/0149168 A1 * | 7/2006 | Czarnek | A61B 5/04882 600/591 |
| 2006/0152231 A1 | 7/2006 | Konermann et al. | |
| 2008/0168833 A1 | 7/2008 | Awad | |
| 2010/0256951 A1 | 11/2010 | Konermann et al. | |
| 2014/0333329 A1 * | 11/2014 | Jeong | H05K 1/0268 324/671 |
| 2017/0231277 A1 * | 8/2017 | Mironov | A24F 47/008 392/404 |

FOREIGN PATENT DOCUMENTS

| | | |
|---|---|---|
| CN | 103196358 A | 7/2013 |
| CN | 203148375 U | 8/2013 |
| EP | 1148315 A2 | 10/2001 |
| GB | 1436698 A | 5/1976 |
| JP | 2012516258 A | 7/2012 |
| JP | 2014178271 A | 9/2014 |
| TW | 201037269 A | 10/2010 |
| WO | 9220989 A1 | 11/1992 |

OTHER PUBLICATIONS

Bull, K., "Methods of Accurately Measuring Capacitive RH Sensors", 5th International Symposium on Humidity and Moisture, ISHM 2006, May 2, 2006, pp. 1-4, Rio de Janeiro, Brazil.

* cited by examiner

NON-INVASIVE THICKNESS MEASUREMENT USING CAPACITANCE MEASUREMENT

BACKGROUND

The present invention relates to thickness measurements, and particularly to non-invasive thickness measurements, which in some embodiments may have particular applicability to measuring thickness of a vehicle tire.

Measuring the thickness of a material can be accomplished in a variety of ways. For example, a material sample may be cut from the material and then physically or optically measured. Alternatively, the material may be punctured by a suitable device, and the thickness measured thereby. However, for some materials, it may be undesirable to damage the material in order to measure the thickness of the material. Accordingly, some physically non-invasive thickness measurement techniques have been developed. For example, U.S. Pat. No. 7,135,869 describes an approach that utilizes a cavity resonator that is closed off by being placed against a coated metallic surface, with the thickness of the coating being determined based on the resulting resonate frequency of the cavity resonator. However, such an approach requires the presence of a metallic substrate, a homogenous coating layer, physical access to the exposed surface of the coating, and that the cavity resonator be placed physically against the coating, some or all of which may be inappropriate for other situations than for testing coating thickness on an aircraft wing. Likewise, U.S. Pat. No. 5,093,626 teaches a contact measuring device for determining dry film thickness of paint using a hand held probe, but the paint must be on a conductive primer film.

Thus, while prior art approaches to thickness measurements may be suitable for some situations, they may not be ideal for all situations. Accordingly, there remains a need for alternative approaches to measuring a thickness of a material, particularly methods that are physically non-invasive, and to corresponding apparatuses.

SUMMARY

Described below are one or more embodiments of methods of measuring thickness of a material, and/or to related apparatuses. The method generally includes applying a time-varying signal to a first pad and monitoring a response of a capacitor formed by the first pad, a spaced apart second pad, and the material. Based on the response, a capacitance of the capacitor is determined. The material may be homogenous or heterogeneous, and has dielectric properties. Because the material acts as a dielectric, the capacitance of the capacitor changes as the thickness of the material changes. Thus, the thickness of the material may be determined based on the determined capacitance. The present invention may be advantageously employed to measure the thickness of a vehicle tire, but the invention is not limited in all embodiments to vehicle tire applications.

In one or more embodiments, the present invention provides a method of determining a thickness of a material. The method comprises: a) applying a time-varying signal to a first pad; wherein the first pad is disposed in spaced relation to a second pad and electrically isolated therefrom; wherein the second pad is grounded; wherein the first and second pads are permanently affixed to the material; wherein the first pad, the second pad, and the material jointly form a capacitor; b) determining a capacitance of the capacitor based on an electrical response of the capacitor to the application of the time-varying signal to the first pad; and c) determining the thickness of the material based on the determined capacitance. The time-varying signal may be an oscillating signal. The material may have first and second generally oppositely disposed surfaces. with the first and second pads are permanently affixed to the first surface. The material may be a tire, with the first surface being an inner surface of the tire. The material may comprise metal embedded in a dielectric material, and/or the material may be a vehicle tire with the metal comprising a steel reinforcing mesh for the vehicle tire. The material may have a plurality of recesses on a surface thereof disposed opposite the first and second pads. The first pad and the second pad may be disposed substantially parallel to each other, or otherwise, and/or may be spaced from each other by 1 mm or less, advantageously about 0.15 mm.

In other embodiments, the present invention provides a method of determining a thickness of a material between first and second generally oppositely disposed surfaces. The method comprises: a) applying a time-varying signal to a first pad; wherein the first pad is disposed in spaced relation to a second pad and electrically isolated therefrom; wherein the second pad is grounded; wherein the first pad, the second pad, and the material jointly form a capacitor; wherein the second surface of the material comprises a plurality of recesses therein; wherein the material is a heterogeneous material comprising a first metallic component embedded in a second dielectric component, wherein the first and second components are distinct from each other; b) determining a capacitance of the capacitor based on an electrical response of the capacitor to the application of the time-varying signal to the first pad; c) determining the thickness of the material based on the determined capacitance. The time-varying signal may be oscillating signal. The material may be a tire, with the first surface being an inner surface of the tire and/or the first metallic component may be a steel reinforcing mesh for the vehicle tire. The first pad and the second pad may be disposed substantially parallel to each other, or otherwise.

In some embodiments, the present invention provides a tire assembly comprising a tire comprising a dielectric material and a metal material embedded therein. The tire has an inner surface and an exterior surface disposed generally opposite to the inner surface. The assembly further includes first and second electrically conductive pads. The second pad is grounded. The first and second pads are permanently affixed to the interior surface of the material, with the first pad disposed in spaced relation to a second pad and electrically isolated therefrom. The first pad, the second pad, and the material jointly form a capacitor. The assembly further includes a processing circuit communicatively connected to the first and second pads and configured to: a) apply a time-varying signal to a first pad; b) determine a capacitance of the capacitor based on an electrical response of the capacitor to the application of the time-varying signal to the first pad; and c) determine a thickness of the material based on the determined capacitance. The processing circuit may be configured to determine the local thickness based on the capacitance by consulting a lookup table of reference values. The processing circuit may be mounted to the tire. The exterior surface of the tire may comprise a plurality of recesses. The first and second pads may be disposed substantially parallel to each other, or otherwise. In some embodiments, the first and second pads comprise a first sensor assembly, and the assembly further includes a second sensor assembly disposed in spaced relation to the first sensor assembly, with the second sensor assembly configured to determine a local thickness of the tire at a location spaced from the first sensor assembly.

The various aspects of the devices and methods discussed herein may be used alone or in any combination. Further, the present invention is not limited to the above features and advantages. Indeed, those skilled in the art will recognize additional features and advantages upon reading the following detailed description, and upon viewing the accompanying drawings.

DETAILED DESCRIPTION

In one or more embodiments, the present application is directed to methods of measuring thickness of a material using cross-capacitance, and/or to related apparatuses. The method generally includes applying a time-varying signal to a first pad and monitoring a response of a capacitor formed by the first pad, a spaced apart second pad, and the material. Based on the response, a capacitance of the capacitor is determined. The material may be homogenous or heterogeneous, and has dielectric properties. Because the material acts as a dielectric, the capacitance of the capacitor changes as the thickness of the material changes. Thus, the thickness of the material may be determined based on the capacitance. The present invention may be advantageously employed to measure the thickness of a vehicle tire, but the invention is not limited in all embodiments to vehicle tire applications.

Figure 1:
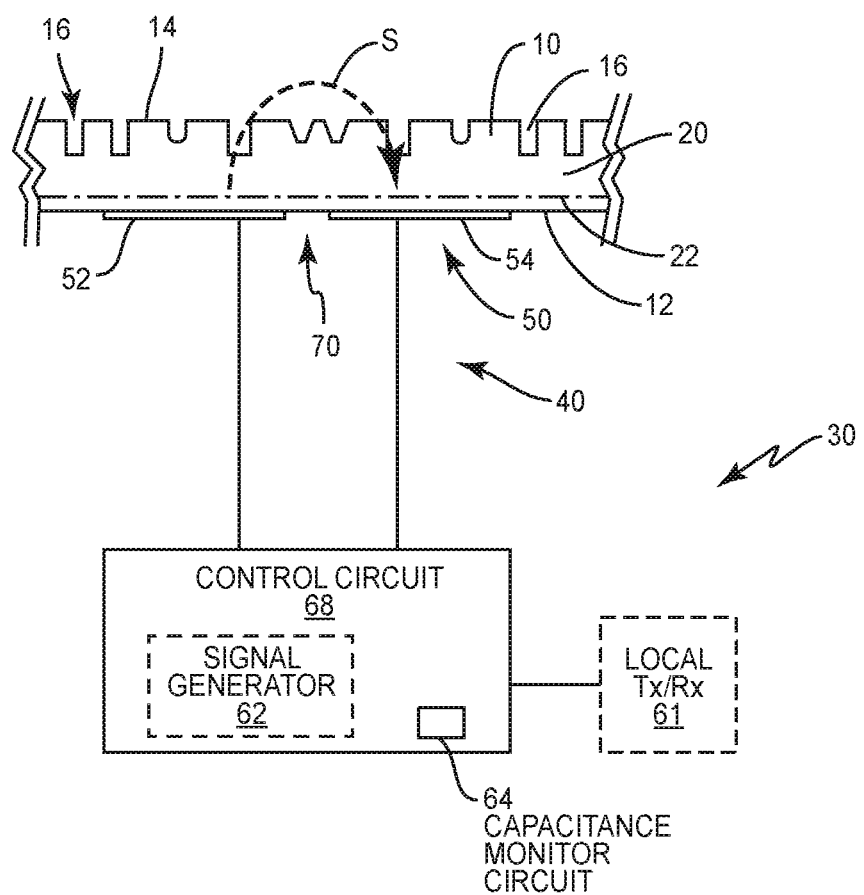
FIG. 1 shows a portion of a tire with a thickness measurement device according to one embodiment, with a material having a plurality of recesses therein.

In one exemplary embodiment, shown in FIG. 1, a measurement circuit (generally indicated at 40) forms a portion of a measurement device 30. The simplified measurement circuit 40 of FIG. 1 includes a sensor assembly 50, and a control circuit 68.

The sensor assembly 50 of FIG. 1 is mounted to a surface of a material 10 to facilitate measurement of the material's thickness. The sensor assembly 50 includes a first pad 52 and a second pad 54 that are disposed proximate to, but spaced from, each other. The first and second pads 52,54 are electrically conductive and electrically isolated from each other. In the illustrated embodiment, the first pad 52 and the second pad 54 are both generally planar, and disposed physically parallel to each other, and disposed in the same plane, but none of these features are required. Thus, the first and second pads 52,54 may alternatively be disposed in non-parallel orientations, and/or disposed in different planes, and/or may not be planar (e.g., significantly curved, although being substantially planar is believed to be advantageous). For the embodiment of FIG. 1, the first pad 52 has a signal S applied thereto and transmits the signal S, and may therefore be referred to as the signal pad 52. For the embodiment of FIG. 1, the second pad 54 is connected to ground; the second pad 54 may therefore sometimes be referred to as the ground pad 54.

The first and second pads 52,54 may take any suitable form. In one or more embodiments, the first and second pads 52,54 are advantageously generally rectangular, with suitable leads extending therefrom. The first and second pads 52,54 are advantageously small. For example, the first and second pads 52,54 may be generally rectangular, with dimensions of approximately 10 mm by 10 mm, or 10 mm by 5 mm, or more advantageously 5 mm by 5 mm. Of course other shapes and sizes may be alternatively employed, as is desired. In addition, the first and second pads 52,54 are disposed in close proximity to, but spaced from, each other, such as by gap of 1 mm or less, advantageously about 0.15 mm. The close spacing of the first and second pads 52,54 allows for more reliable cross-capacitance between the first and second pads 52,54. As may be desired, the first and second pads 52,54 may include conductive portions formed by any suitable method, such as by vapor deposition or aerosol ink jet printing of conductive material, optionally on suitable corresponding substrate materials, such as KAPTON brand polyimide film available from DuPont, and with suitable adhesive additions to mount to a surface (e.g., surface 12) of the material 10. The first and second pads 52,54 may be mounted to the surface of the material with the conductive portions in direct contact with the surface, or with the substrate and/or adhesive disposed therebetween.

Is should be noted that the first and second pads 52,54 are stationary relative to the material 10 during the thickness measurement process, so that the first and second pads 52,54 and the material 10 jointly form a capacitor 70. That is, there is no relative movement between the first and second pads 52,54 and the material 10 during the measurement process, and at least some of the electric field between the first and second pads 52,54 passes through the material 10. While not required for all embodiments, the first and second pads 52,54 are advantageously permanently affixed to a surface 12 of the material 10 at a fixed location, such as by adhesive or the like. In other embodiments, the first and second pads 52,54 may be temporarily mounted to the surface 12, such as with a suitable mechanism (e.g., brace or jig) for pressing the first and second pads 52,54 against the surface 12 of the material 10 with reproducible pressure. In still other embodiments, the first and second pads 52,54 may be embedded in the material 10, so as to be able to measure a thickness of the material 10 from the location of the pads 52,54 to a surface of the material 10.

The control circuit 68 generates the signal S to be applied to the signal pad 54, and determines the capacitance C of the capacitor 70 (jointly, the first and second pads 52,54, and the material 10) based on the response of the capacitor 70 to the signal S. The control circuit 68 then determines the thickness of the material 10 based on the determined capacitance.

Figure 2:
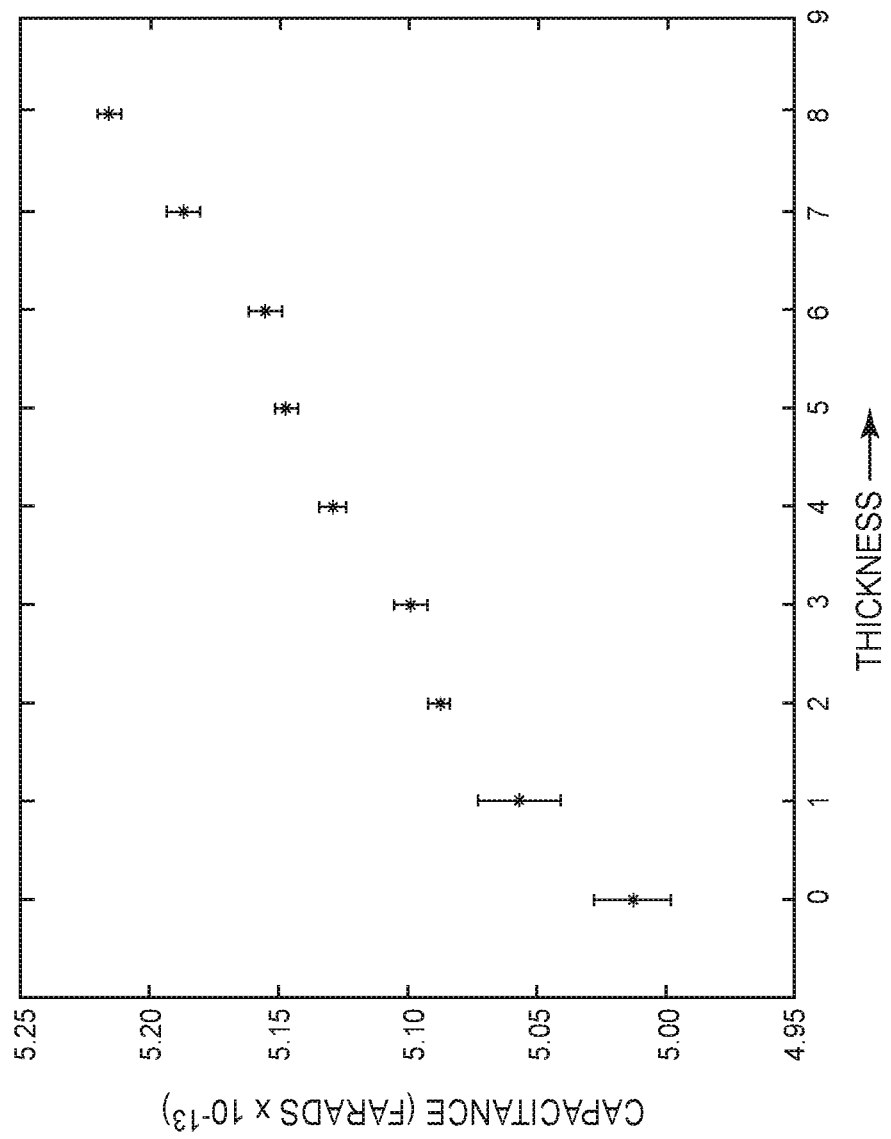
FIG. 2 shows a graph of capacitance vs. material thickness.
Figure 3:
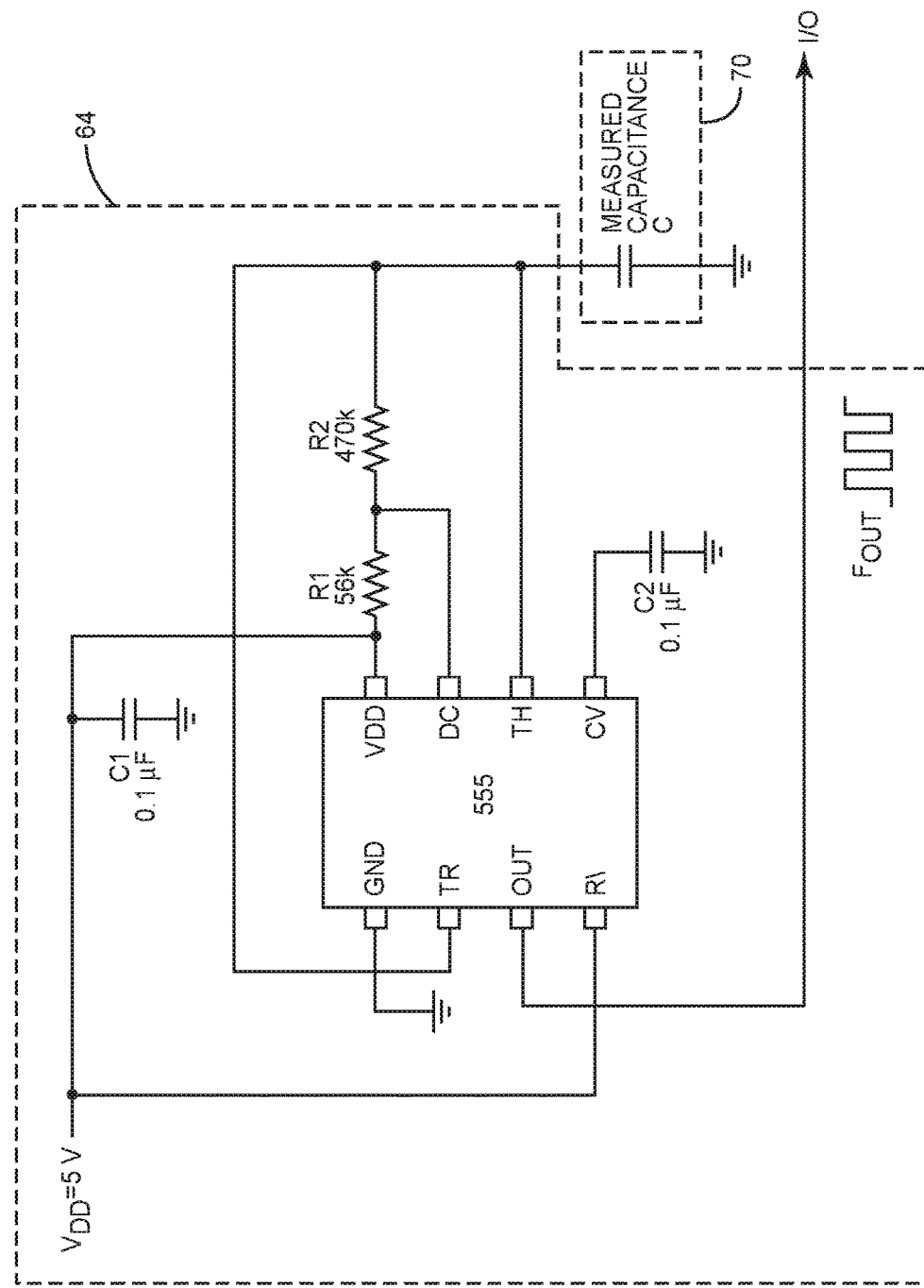
FIG. 3 shows a simplified schematic of one embodiment of a capacitance monitoring circuit.

As mentioned above, the control circuit 68 determines the capacitance of the capacitor 70 formed by the signal pad 52, the material 10, and the ground pad 54. In one embodiment, the control circuit 68 may use an oscillator based approach to measure the capacitance. The control circuit 68 may include a capacitance monitoring (sub) circuit 64 like that shown in FIG. 3. In the context of the capacitance monitoring circuit 64, the capacitor 70 has a capacitance C. This capacitance C is connected to a timer circuit of a type known as a "555" timer, along with other resistors ($R_1,R_2$) and fixed capacitor(s) $C_1,C_2$. The 555 timer, operating in what is known as a stable mode, outputs a stream of rectangular pulses having a frequency (f). The frequency f is related to the capacitance C of the system by the equation $f=1/(\ln(2)*C*(R_1+2R_2))$, where $R_1$ and $R_2$ are values of the resistors in ohms, and C is expressed in farads. The output stream of pulses from the 555 timer may be fed to a counting circuit portion of the control circuit 68 that counts the number of pulses over a fixed time period to determine the frequency f. This frequency f may then be used by the control circuit 68 to calculate the capacitance C based on the equation noted above. Then, based on the determined capacitance, the control circuit 68 is able to determine the thickness and/or thickness change of the material. To do so, the control circuit 68 may compare the measured capacitance to pre-stored reference information about capacitance vs. thickness. For example, the control circuit 68 may access an internal and/or external look-up table of empirically measured capacitances and corresponding thicknesses. Such a lookup table may represent the relationship of capacitance vs. material thickness, such as that shown in FIG. 2. As can be appreciated, the curve of this plot may be used to determine thickness from the determined capacitance using any suitable computational technique. The control circuit 68 may take any suitable form, such a suitably programmed general purpose processor, an ASIC, discrete hardware components, or any combination thereof.

Figure 4:
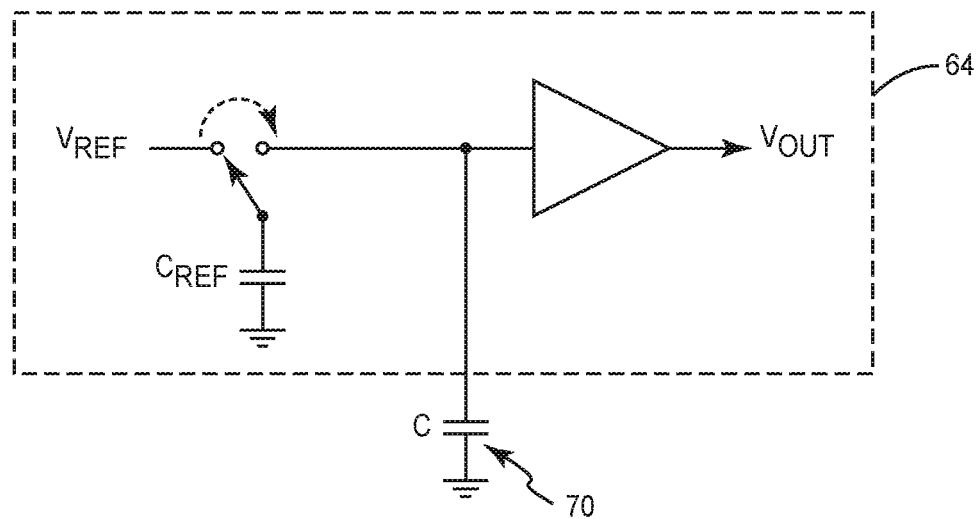
FIG. 4 shows a simplified schematic of another embodiment of a capacitance monitoring circuit.

In other embodiments, the capacitance monitoring circuit 64 may alternatively use a charge based approach, rather than an oscillator based approach. For example, the capacitance monitoring circuit may take a form similar that shown in FIG. 4. The capacitance monitoring circuit 64 of FIG. 4 employs a reference capacitor $C_{ref}$, a known voltage source $V_{ref}$, a switch, and produces a voltage out signal $V_{out}$. $C_{ref}$ is first charged by $V_{ref}$, and then switched in parallel with capacitance C. The capacitance C of capacitor 70 can be determined by the control circuit 68 based on the voltage across the combined $C_{ref}$ and C by the using the relationship of $C=C_{ref}*(V_{ref}/(V_{out}-1))$. The control circuit 68 can then determine the thickness of the material 10, based on the determined capacitance, as described above.

Figure 5:
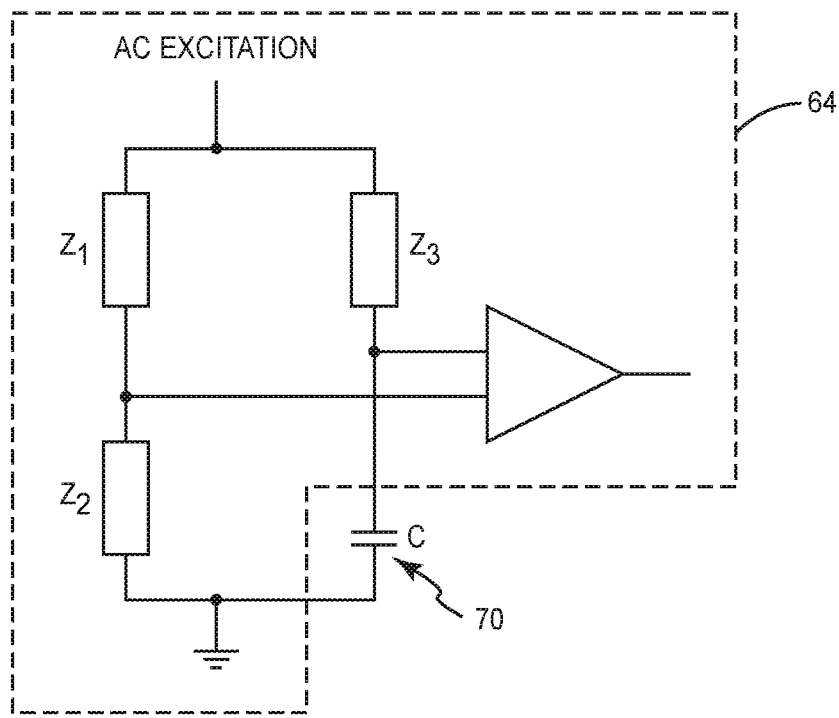
FIG. 5 shows a simplified schematic of still another embodiment of a capacitance monitoring circuit.

In other embodiments, the capacitance monitoring circuit 64 may alternatively use a bridge technique, rather than charge based approach or an oscillator based approach. For example, the capacitance monitoring circuit 64 may take a form similar that shown in FIG. 5. The capacitance monitoring circuit 64 of FIG. 5 employs a three known impedances $Z_1$-$Z_3$ (e.g., fixed resistors and capacitors in series) and the capacitance C arranged in a bridge configuration, and driven by an AC excitation signal. The unbalanced voltages between the legs is measured and is proportional to the capacitance C. Thus, the capacitance C of the capacitor 70 can be determined by the control circuit 68 based on the measured voltage difference. The control circuit 68 can then determine the thickness of the material 10, based on the determined capacitance, as described above.

Alternatively, the capacitance monitoring circuit 64 may use other capacitance measurement approaches known in the art. The control circuit 68 can then determine the thickness of the material 10 based on the determined capacitance, as described above. For example, the capacitance monitoring circuit 64 may monitor the voltage of the signal pad 52 that results from the response to a current pulse. Assuming a current pulse of magnitude M and duration T, then the capacitance C can be determined by using the formula $C=MT/v(T)$, where v(T) is the voltage difference between the signal pad 52 and the ground pad 54 at time T (at the end of the current pulse). Alternatively, the capacitance monitoring circuit 64 may wait until the voltage difference between the signal pad 52 and the ground pad 54 reaches a predetermined level V and measure the time $T_1$ at which this happens relative to the start of the current pulse, and then determine the capacitance C by using the formula $C=MT_1/V$. The control circuit 68 can trigger the current pulse, and thereby control when the thickness measurement occurs.

In some embodiments, the control circuit 68 may include a signal generator (sub) circuit 62 for generating the signal S to be applied to the signal pad 52. The signal generator circuit 62 may generate a pulse signal or an oscillating signal, as is desired. As such, in some embodiments, the signal generator circuit 62 generates signal S as an oscillating signal (AC signal) at a frequency. In a simple embodiment, the signal generator 62 may generate the signal at a fixed frequency. In other embodiments, the signal generator 62 may generate the signal at a frequency that is tunable under the control of other portions of the control circuit 68. The frequency of the signal S generated by the signal generator 62 may advantageously be in the range of approximately 1-10 MHz. In some embodiments, the signal generator 62 may take the form of a voltage controlled oscillator.

It should be noted that the control circuit 68 may advantageously be configured to communicate the determined material thickness to other device(s) (e.g., a vehicles central control system), such by being operatively connected to a suitable short range (e.g., BLUETOOTH, ZIGBEE, Radio Frequency Identification (RFID), etc.) transmitter/receiver 61 or by other suitable communications techniques.

It should be further noted that the various components of the measurement circuit 40 are powered by one or more power sources (not shown), such as batteries and/or capacitors, which may be centrally located or distributed as is desired, and/or energy obtained from radio frequency (RF) signals received by portions of the measurement circuit 40.

For all the measurement circuit embodiments, as discussed above, the material 10 may be homogenous or heterogeneous, and has dielectric properties. Thus, the material 10 may be homogeneous, and may optionally have an exterior surface 14 that comprises a plurality of recesses 16 therein, such as the recesses 16 that define treads of a tire. As such, the thickness of the material 10 in the area being measured may not be a single uniform thickness, but may be a composite value, such as an average thickness. The material 10 may alternatively be heterogeneous, such as a conventional "steel belted" radial tire 10 that has a steel reinforcing mesh or "belt" 22 entirely or partially embedded in a natural or synthetic "rubber" matrix 20. One or more of the components of the heterogeneous material may be electrically conductive metallic material (e.g., the steel belts 22), while at least one other of the components is dielectric (e.g., the rubber 20). As can be appreciated, the heterogeneous material, if in the form of a vehicle tire, may be a "slick" (without significant recesses on its exterior surface) or may be "treaded" (with significant recesses on its exterior surface).

Figure 6:
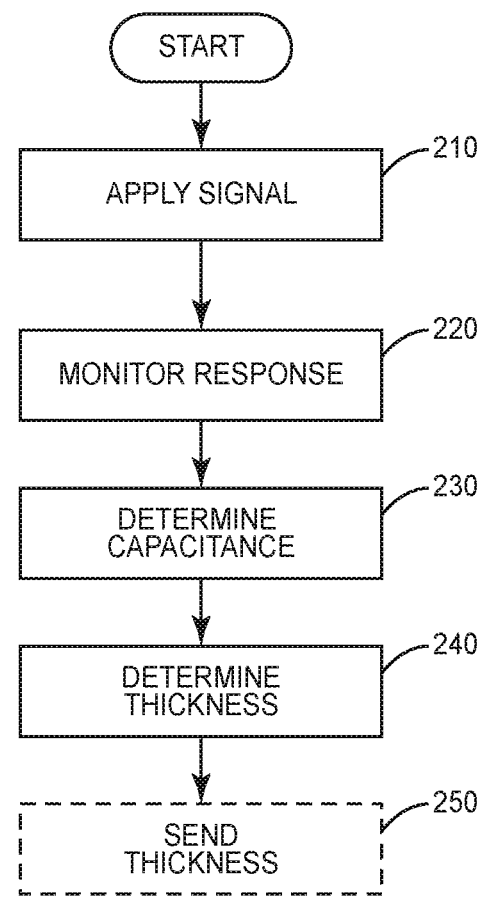
FIG. 6 shows simplified process flow chart for one or more embodiments.

With reference to FIG. 6, a method of measuring the thickness may start by the control circuit 68 causing the time-varying signal S to be applied to the signal pad 52 (step 210). The response of the capacitor 70 to the signal S is monitored by the control circuit 68 (step 220). Note that the response of the capacitor 70 is dependent on the thickness of the material 10 because at least some of the electric field generated at the signal pad 52 (due to the application of signal S) passes through the material 10 to interact with the ground pad 54, and different thicknesses will cause different reactions. The process continues to step 230, where the capacitance is determined. Next, the thickness of the material is determined based on the determined capacitance (step 240). The process may then proceed to optional step 250 where the determined thickness is supplied to other electronics for subsequent processing and/or display, as is appropriate.

Figure 7:
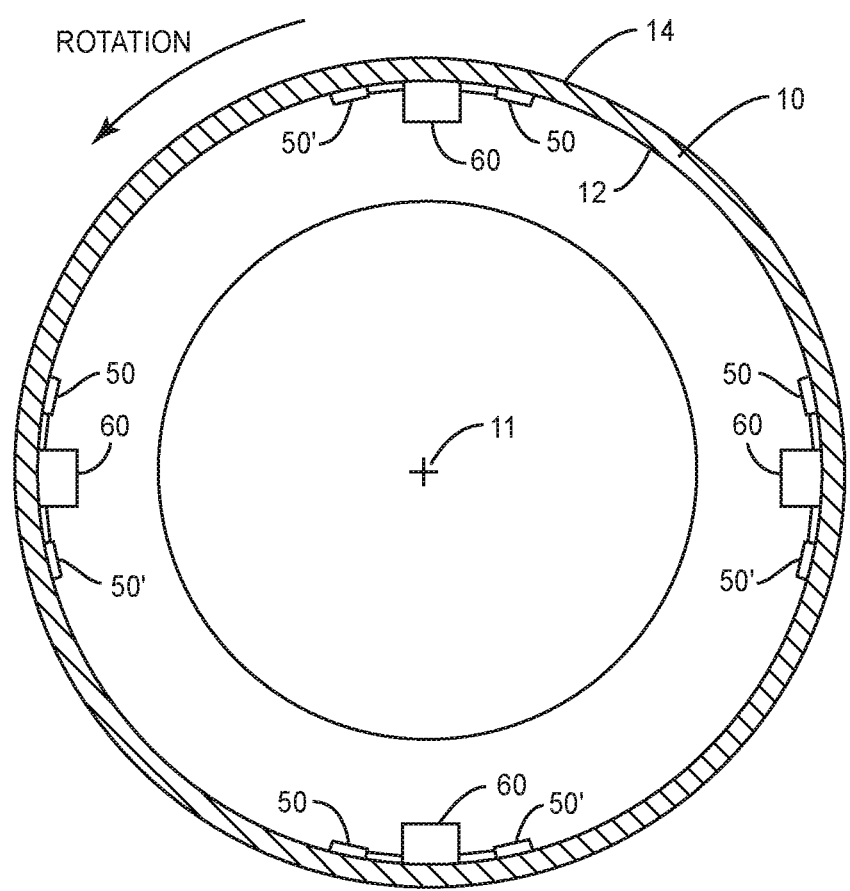
FIG. 7 shows a cross-section of a tire with multiple measurement circuits mounted to an inside surface thereof
Figure 8:
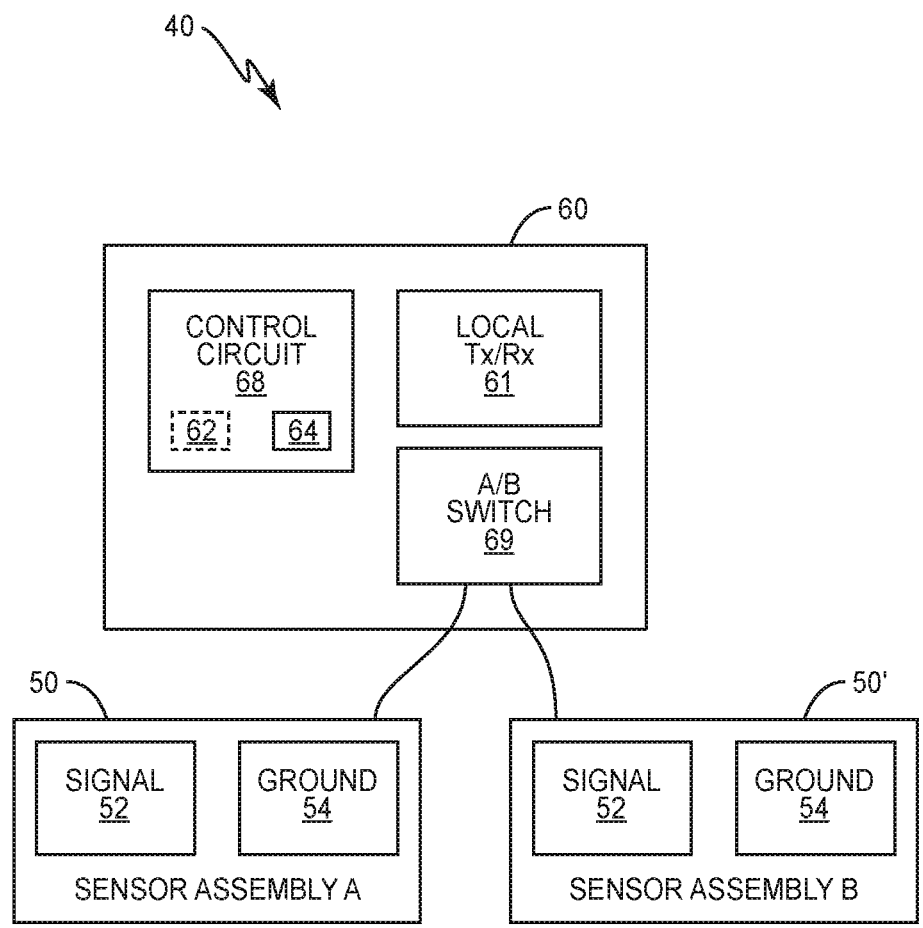
FIG. 8 shows a dual sensor assembly measurement circuit of the type shown in FIG. 7.

Using a mounted vehicle tire (tire 10 mounted on a wheel) as an exemplary environment, the measurement circuit 40 may be permanently mounted to the inner surface 12 of the tire 10, with the signal pad 52 and reflection pad 54 abutting the inner surface 12 of the tire 10. If only a single measurement circuit 40 is to be employed, suitable counterweight(s) (not shown) are advantageously added to the associated wheel and/or tire 10 to offset the mass of the measurement circuit 40 so as to maintain rotational balance. While only a single measurement circuit 40 may be used, it is believed advantageous if multiple measurement circuits 40 are employed, with the corresponding sensor assemblies 50 distributed to suitable spaced apart locations around the tire 10. In some embodiments, each sensor assembly 50 may have a corresponding dedicated control circuit 68; in other embodiments, the sensor assemblies 50 may share one or more control circuits 68, and/or signal generators 62, and/or signal analyzers 64, and may be time multiplexed. For example, as shown in FIGS. 7-8, one approach is to utilize a common main circuit 60 connected to a plurality of sensor assemblies 50,50', advantageously with a plurality of such multi-sensor assembly measurement circuits disposed around the tire 10 in spaced relation to each other. The main circuit 60 includes the control circuit 68, the local transmitter/receiver 61, and an A/B switch 59. Sensor assembly 50 and sensor assembly 50' connect to the main circuit 60 via the A/B switch 69, each with their own signal and reflection pads 52,54. The A/B switch 69 may be used to switch between the sensor assemblies 50,50' so that the same main circuit 60 may be used to determine the thickness at two different locations without being moved. Of course, A/B switch 69 may instead be a suitable multiplexer/demultiplexer, as is desired. Further, this approach to multi-sensor assembly measurement circuits may be expanded so that a single main circuit 60 is connected to and uses three, four, or more sensor assemblies 50, rather than just two sensor assemblies 50,50' illustrated in FIGS. 7-8.

Continuing with the mounted vehicle tire 10 as an exemplary environment, in some embodiments, portions of the measurement circuit 40 may be disposed outside the tire 10, rather than the entirety of the measurement circuit 40 being disposed inside the tire 10. In one such example, the sensor assembly 50 may be mounted to the interior surface of the tire 10, and a suitable short range transmitter/receiver device pair (e.g., a BLUETOOTH transmitter/receiver pair, a ZIGBEE transmitter/receiver pair, an RFID transmitter/receiver pair, etc.) (not shown) interposed between the control circuit 68 and the balance of the measurement circuit 40, so that the control circuit 68 is mounted in a fixed location (e.g., on the corresponding vehicle wheel well), and communicates via the intervening wireless link with the sensor assembly 50 and other portions of the measurement circuit 40.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a thickness of a vehicle tire, the method comprising:
    applying a time-varying signal to a first electrically conductive pad; wherein the first pad is disposed in spaced relation to a second electrically conductive pad and electrically isolated therefrom; wherein the second pad is grounded; wherein the first and second pads are permanently affixed to the vehicle tire; wherein the first pad, the second pad, and the vehicle tire jointly form a capacitor;
    determining a capacitance of the capacitor based on an electrical response of the capacitor to the application of the time-varying signal to the first pad;
    determining the thickness of the vehicle tire based on the determined capacitance;
    wherein the time-varying signal is an oscillating signal;
    wherein the vehicle tire has first and second generally oppositely disposed surfaces; wherein the first and second pads are permanently affixed to the first surface; wherein the first surface is an inner surface of the vehicle tire;
    wherein the vehicle tire comprises a steel reinforcing mesh embedded in a dielectric material; wherein the determined thickness includes the thickness of the combined steel reinforcing mesh and the dielectric material;
    wherein the determining the capacitance comprises controlling a timing circuit based on the electrical response of the capacitor, and counting an output of the timing circuit to determine a frequency, and determining the capacitance based on the frequency.

2. The method of claim 1, wherein the first pad and the second pad are disposed substantially parallel to each other.

3. The method of claim 1, wherein the vehicle tire has a plurality of recesses on a surface thereof disposed opposite the first and second pads.

4. The method of claim 1, wherein the first and second pads are spaced from each other by about 0.15 mm.

5. A method of determining a thickness of a vehicle tire between first and second generally oppositely disposed surfaces, the method comprising:
    applying a time-varying signal to a first electrically conductive pad; wherein the first pad is disposed in spaced relation to a second electrically conductive pad and electrically isolated therefrom; wherein the second pad is grounded; wherein the first pad, the second pad, and the vehicle tire jointly form a capacitor; wherein the second surface of the vehicle tire comprises a plurality of recesses therein; wherein the vehicle tire is a heterogeneous material comprising a first metallic component embedded in a second dielectric component, wherein the first and second components are distinct from each other;
    determining a capacitance of the capacitor based on an electrical response of the capacitor to the application of the time-varying signal to the first pad;
    determining the thickness of the vehicle tire based on the determined capacitance;
    wherein the time-varying signal is an oscillating signal;
    wherein the first and second pads are permanently affixed to the first surface; wherein the first surface is an inner surface of the vehicle tire;
    wherein the determined thickness includes the thickness of the combined first metallic component and the second dielectric material;
    wherein the determining the capacitance comprises controlling a timing circuit based on the electrical response of the capacitor, and counting an output of the timing circuit to determine a frequency, and determining the capacitance based on the frequency.

6. The method of claim 5, wherein the first pad and the second pad are disposed substantially parallel to each other.

7. A tire assembly, comprising:
a tire comprising a dielectric material and a metal material embedded therein; the tire having an inner surface and an exterior surface disposed generally opposite to the inner surface;
a first electrically conductive pad;
a second electrically conductive pad; wherein the second pad is grounded;
wherein the first and second pads are permanently affixed to the interior surface of the material; wherein the first pad is disposed in spaced relation to a second pad and electrically isolated therefrom;
wherein the first pad, the second pad, and the material jointly form a capacitor;
a processing circuit communicatively connected to the first and second pads and configured to:
apply a time-varying signal to a first pad;
determine a capacitance of the capacitor based on an electrical response of the capacitor to the application of the time-varying signal to the first pad;
determine a thickness of the material based on the determined capacitance;
wherein the determining the capacitance comprises controlling a timing circuit based on the electrical response of the capacitor, and counting an output of the timing circuit to determine a frequency, and determining the capacitance based on the frequency.

8. The tire assembly of claim 7, wherein the exterior surface of the tire comprises a plurality of recesses.

9. The tire assembly of claim 7, wherein the first and second pads are disposed substantially parallel to each other.

10. The tire assembly of claim 7, wherein the processing circuit is configured to determine the local thickness based on the capacitance by consulting a lookup table of reference values.

11. The tire assembly of claim 7, wherein the processing circuit is mounted to the tire.

12. The tire assembly of claim 7:
wherein the first pad and the second pad comprise a first sensor assembly;
further comprising a second sensor assembly disposed in spaced relation to the first sensor assembly; the second sensor assembly configured to determine a local thickness of the tire at a location spaced from the first sensor assembly.

* * * * *